United States Patent [19]
Coulon, Jr.

[11] Patent Number: 4,572,999
[45] Date of Patent: Feb. 25, 1986

[54] BRUSHLESS TACHOMETER

[75] Inventor: Philip S. Coulon, Jr., Radford, Va.

[73] Assignee: Kollmorgen Technologies Corporation, Dallas, Tex.

[21] Appl. No.: 504,121

[22] Filed: Jun. 14, 1983

[51] Int. Cl.⁴ ............................................. G05B 5/01
[52] U.S. Cl. ................................. 318/618; 318/327; 322/DIG. 5; 322/31
[58] Field of Search .............. 318/653, 660, 327, 618; 322/DIG. 5, 31, 94, 8, 29

[56] References Cited

U.S. PATENT DOCUMENTS

| | | | |
|---|---|---|---|
| 3,754,175 | 8/1973 | Girault | 318/327 X |
| 3,771,036 | 11/1973 | Roggero | 318/327 X |
| 4,017,858 | 4/1977 | Kuipers | 318/653 X |
| 4,088,943 | 5/1978 | Schmidt | 322/94 X |
| 4,103,215 | 7/1978 | Naydan et al. | 318/660 X |
| 4,364,005 | 12/1982 | Kohzai et al. | 322/31 |
| 4,406,983 | 9/1983 | Ramirez | 318/653 |

Primary Examiner—B. Dobeck
Attorney, Agent, or Firm—Morgan, Finnegan, Pine, Foley & Lee

[57] ABSTRACT

A brushless tachometer in which output signal switching is achieved using field effect transistors and which is capable of achieving linearity over a broad range, particularly the zero speed region. According to a preferred embodiment, the brushless tachometer is operated in a current mode as part of the servo loop to substantially reduce tachometer voltage switching requirements. A ROM can be used to control commutation switching. Commutation is preferable line-to-neutral to reduce ripple.

5 Claims, 5 Drawing Figures

BRUSHLESS TACHOMETER

This invention relates to rate sensitive devices, and more particularly, to brushless DC tachometers and servo systems using such tachometers.

BACKGROUND OF THE INVENTION

Semi-conductor switching devices are becoming available at lower costs and with higher power level switching capacities. As a result, the semi-conductor switches find ever increasing use for controlling commutation in brushless DC motors and variable freqency AC motors. These motors can be constructed without moving contacts such as brushes, slip rings, or commutators. Such motors have the advantage of high operating speeds and increased useful life. Furthermore, such motors are more readily utilizable with electronic control systems.

In order to achieve the benefits of the solid state commutation circuitry when the motors are used in position or velocity servo systems, however, it is necessary to also utilize a compatible rate feedback device which likewise avoids mechanical commutation or other moving mechanical contact switches.

Brushless motors are capable of reaching higher speeds than conventional DC motors The same is true of brushless rate sensitive feedback devices. A conventional DC tachometer however cannot reach similarly high speeds due to brush bounce at high speeds caused by small commutator eccentricities.

Brushless motors and tachometers have a longer time between failures since the only moving parts are the rotory shaft bearings. In a conventional DC motor or tachometer the operating life between repair is normally determined and limited by the contact wear of the moving contacts.

Brushless motors can operate in adverse environments (explosive or corrosive environments in particular) since there are no contacts which can cause arcs. This advantage of the motor is lost, however, when a conventional DC tachometer with moving contacts is used in the system.

Conventional tachometers also have a volts per commutator bar limitation which limits the output potential over a given speed range. As a result, such tachometers cannot achieve the higher sensitivities potentially available with brushless rate sensing devices.

In the past, several methods of achieving brushless rate feedback for position and velocity servos have been devised.

One such method employs an incremental sensor which indicates each increment of movement and produces a signal having a frequency proportional to speed. The frequency signal is then converted to either an analog signal proportional to speed or a digital word indicating speed. Such systems are relatively inexpensive but lack precise speed information at very low speeds near zero RPM. In order to provide any rate information at very low speeds (other than zero RPM) the rotor must move until a mark is detected. The time between mark detection can be too long to provide a meaningful frequency indication of speed. Also, such systems do not inherently provide directional information and become more complex when directional information is required.

Another approach is to use a resolver to indicate shaft position. Resolvers provide AC wave forms according to the sine and cosine of the shaft position. These wave forms can be converted into digital words or analog signals proportional to shaft position which in turn can be used to provide rate information. This method provides relatively good results but is quite expensive, particularly if low speed accuracy is required.

Optical encoder systems have also been employed. In such systems a digital word appears at the encoder output representing the shaft position and this information can be processed to provide rate information. This approach is less expensive than that using resolvers, but suffers from low speed limitations similar to those with the incremental sensor mentioned above.

Still another approach is to use an alternator with rotating permanent magnets. The signal produced by the stator windings is proportional in amplitude and frequency to the shaft speed. Where directional speed information is not required, diodes rectifying the alternator output will provide a DC signal proportional to speed. Bi-polar switching transistors controlled by position sensors can be used to get a bi-directional speed indication. However, these approaches using an alternator have a dead band near zero RPM because of the threshold conduction properties of diodes and transistors used in such systems.

SUMMARY OF THE INVENTION

The system according to this invention includes a brushless tachometer using field effect transistors (FET's) for switching the output signal from a multiphased stator winding of a permanent magnet alternator. The resistive conduction characteristics of the FET's make it possible to achieve linearity in the zero speed region which cannot be achieved using other bi-polar semi-conductor devices.

A read-only memory is preferably utilized to control the commutation switching from the alternator output in accordance with a position sensor control. This combination results in a moderately priced brushless DC tachometer providing a bi-polar speed signal with linearity in the zero speed region According to a preferred embodiment of the invention, the alternator generated speed signal, and the associated solid state commutation switches, are directly connected to the current summing junction of the servo amplifier controlling the motor in the system. The tachometer according to the invention thus functions in a current mode rather than in the conventional voltage mode. This approach has been found to substantially increase low speed sensitivity without requiring expensive high voltage switching components. It has also been found that lower ripple in the output signal can be achieved using line-to-neutral commutation rather than line-to-line commutation.

BRIEF SUMMARY OF THE DRAWINGS

The objects of the invention will become readily apparent from the illustrative embodiments of the invention set forth in the following detailed specification which is to be read in combination with the drawings which are as follows.

DETAILED DESCRIPTION OF PREFERRED EMBODIMENTS

Figure 1:
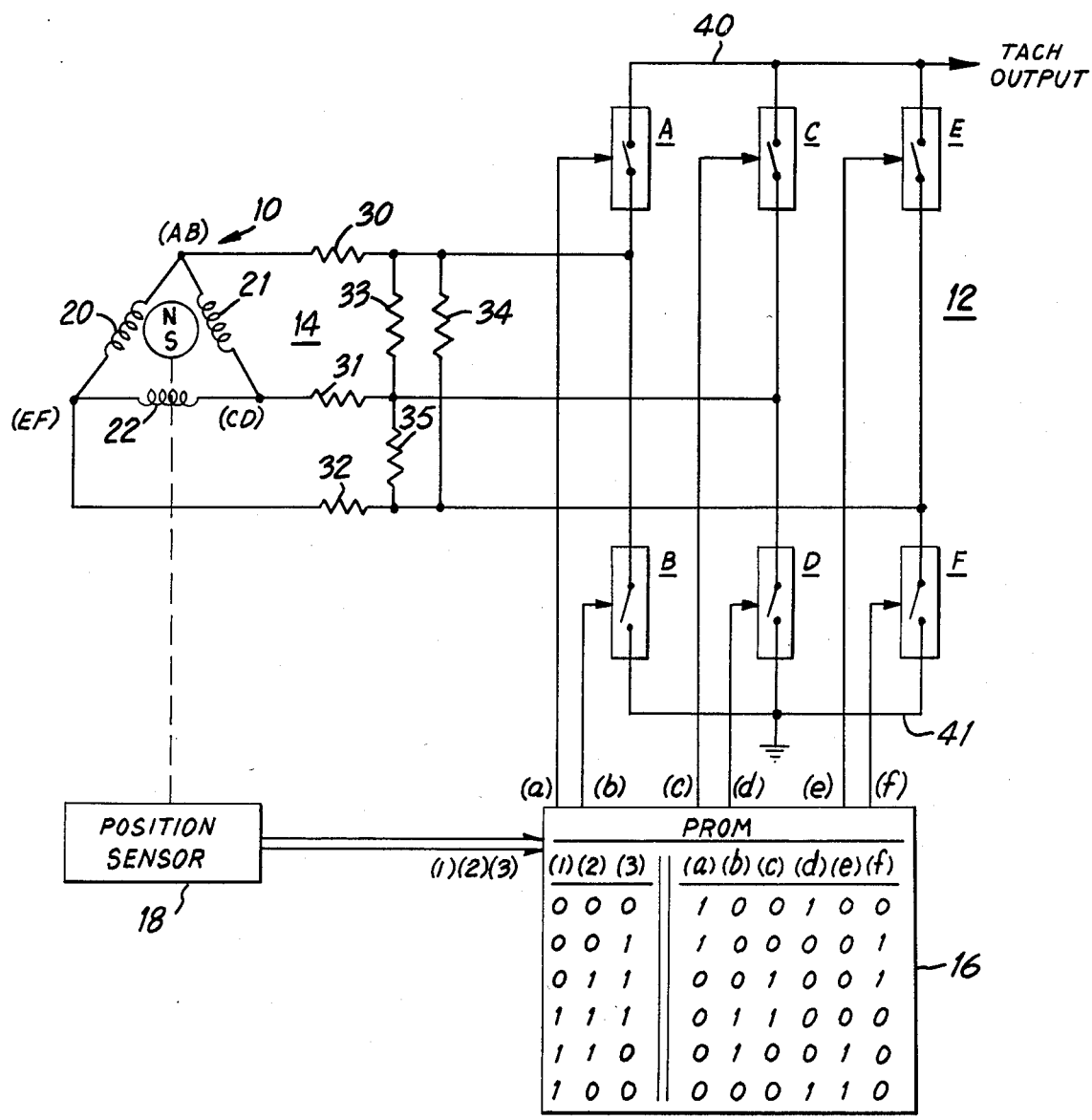
FIG. 1 is a schematic diagram according to one embodiment of the invention.

The tachometer system illustrated in FIG. 1 includes a three-phase alternator 10 coupled to a six transistor switching bridge 12 via a voltage divider network 14. The switching logic is provided by a programmable read only memory (PROM) 16 addressed by a rotor position sensor 18.

More particularly, the alternator includes stator windings 20–22 connected in a three-phase delta configuration and a permanent magnet rotor 23. Rotor 23 is mechanically coupled to position sensor 18 which can be a conventional array of Hall sensors arranged to provide a six position indication in three digit code. Other types of position sensors can also be used such as optical or magnetic encoders.

The three digit position code from position sensor 18 is supplied as the address input, (1), (2) and (3), to a 3×6 PROM 16. The logic table stored in PROM 16 is shown in FIG. 1. For example, if the input address from the position sensor is "000", as in the top line of the table, the digital word "100100" appears on the six output lines (a) to (f) meaning that lines (a) and (d) are high ("1") and that the remaining lines are low ("0").

Resistors 30–35 make up the three phase voltage divider network. Resistors 30–32 are connected in series in the lines between the windings of alternator 10 and the switches of switching bridge circuit 12. Resistors 33–35 are connected between the three-phase lines. The resistance values are selected to reduce the alternator output voltages to values within the range that can be handled by the switching transistors.

Transistor bridge 12 is made up of field effect transistors (FET's) such as RCA CD 4066B which are CMOS (complementary metal oxide semiconductor) bilateral switches. These transistors are available at modest cost and have adequate capacity for most tachometer applications. The peak controllable voltage is in the range beteween +8 volts and −8 volts. The junction AB between windings 20 and 21 is connected to switches A and B in bridge circuit 12 via resistor 30, whereas junction CD between windings 21 and 22 is connected to switches C and D via resistor 31 and junction EF between windings 20 and 22 is connected to switches E and F via resistor 32. Output lines (a) to (f) from PROM 16 are connected to control the conductive states of transistor switches A to F, respectively. Switches B, D and F are connected to a common ground connection 41 whereas switches A, C and E are connected to a common tachometer output line 40.

In operation, the position sensor and PROM 16 render the switches conductive in pairs according to rotor position to provide a DC signal with a value and polarity proportional to the rotor speed and direction. It is significant that FET's are used in the switching bridge since these transistors do not have a threshold offset as is the case with the normal transistor. As a result, the output voltage is proportional to speed throughout the range of operation and particularly in the range near zero.

Alternator 10 is preferably of a type which produces flat top sine waves so that the voltage is reasonably constant during the conduction intervals of the respective switches to reduce ripple in the tachometer output. Preferably the alternating outputs have a trapezoidal shape and are flat from 60 degrees to 120 degrees and from 240 degrees to 300 degrees. Alternator designs to achieve this objective are described in copending applications "Flux Contoured Rotary Electomagnetic Machine", Thomas R. England, (file 403-38) and "Brushless Tachometer", Robert L. Fisher, (file 405-50), filed on even date herewith.

Although the circuit in FIG. 1 is suitable for many installations, it does have a limited range due to the voltage divider and limited range of the FET's. This can pose a problem at low speeds where output signals are small resulting in poor signal to noise ratios. A significant improvement in sensitivity, however, can be achieved as is illustrated in connection with FIGS. 3–4.

Figure 2:
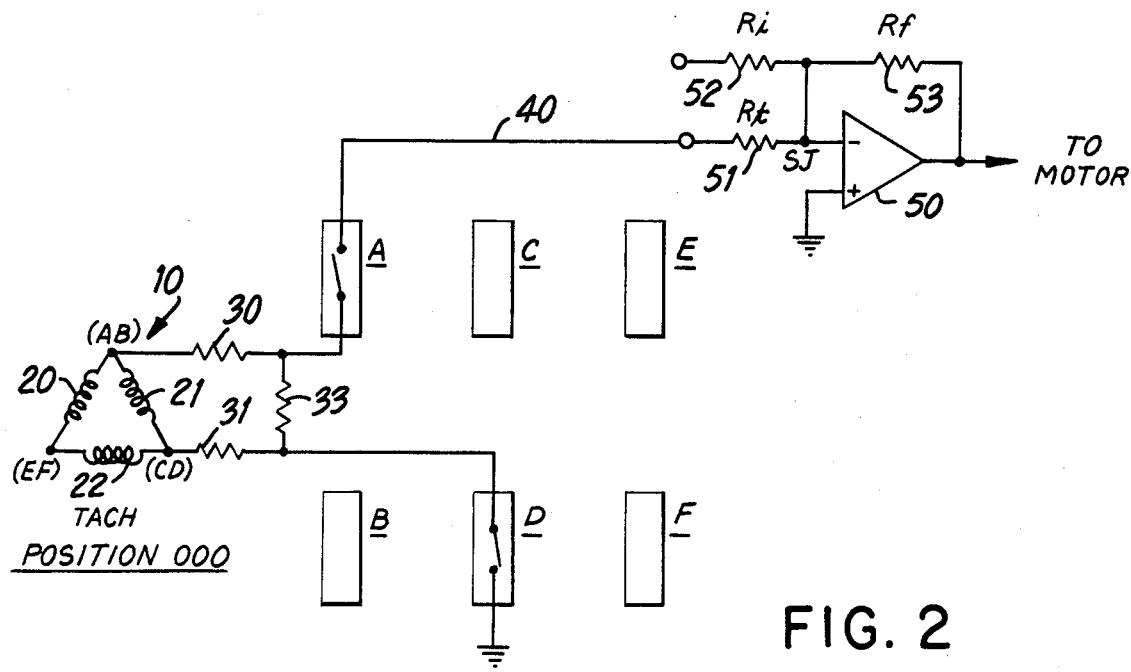
FIG. 2 is a partial schematic diagram showing one phase of the tachometer according to FIG. 1 connected into the servo loop for motor control operating in a voltage mode.

FIG. 2 is a partial schematic diagram illustrating a typical connection of the tachometer arrangement in FIG. 1 to an operational amplifier 50 in the servo loop controlling a motor. The tachometer output line 40 is connected to the summing junction SJ through an input resistor 51. The servo command signal is supplied to the summing junction through an input resistor 52. A feedback resistor 53 is connected across the amplifier. The summing junction is connected to the inverting input of amplifier 50 and the noninverting input is connected to ground.

For position "000" of the rotor where switches A and D are conductive, as illustrated in FIG. 2, the potential generated by windings 20–22 is reduced by the voltage divider resistors 30, 31 and 33 to produce a signal on line 40 proportional to speed. A command voltage representing desired motor speed is supplied to resistor 52. Input resistors 51 and 52 convert the applied voltage signals to current signals which are summed at summing junction SJ. In the usual servo loop operation, a small error signal is developed at the summing junction which drives the amplifier and determines the motor energization. The servo loop automatically adjusts the motor energization until the motor and tachometer speed corresponds to the desired speed at which point the tachometer signal offsets the command signal. As previously mentioned, sensitivity in this arrangement is limited by the the voltage range of the transistor switches.

Figure 3:
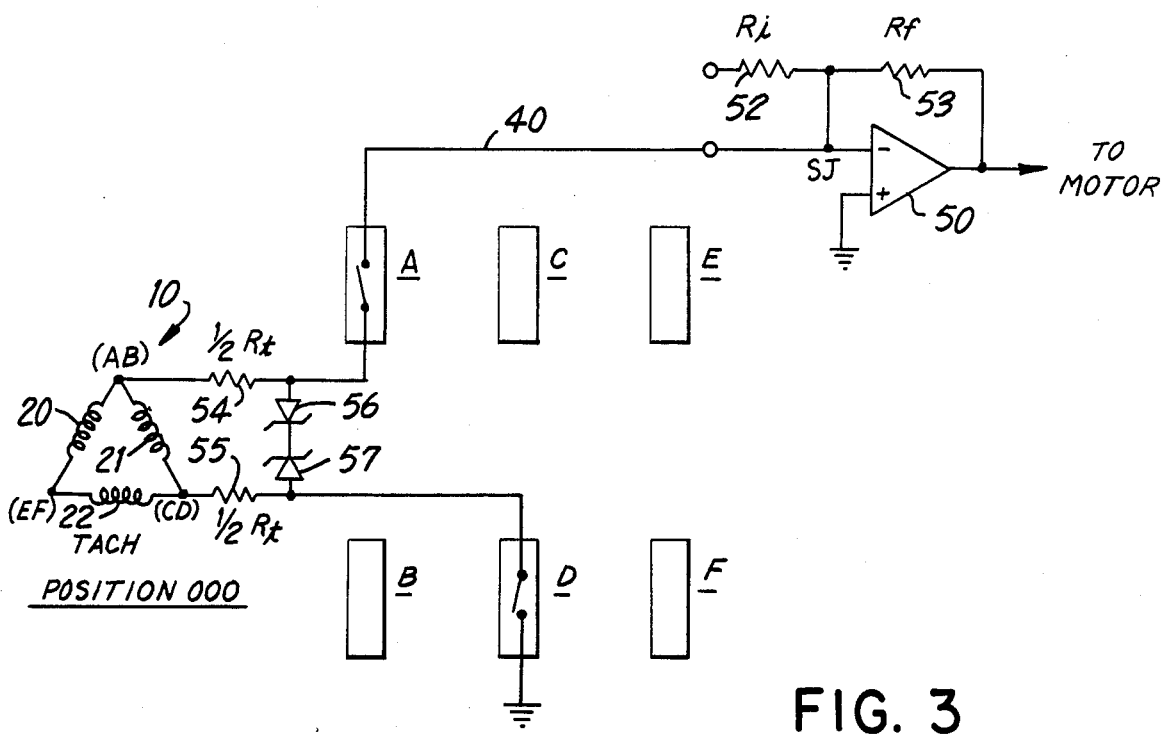
FIG. 3 is a partial schematic diagram illustrating the connection of one phase of a preferred tachometer arrangement connected to the servo loop for motor control operating in a current mode.

Sensitivity of the system can be substantially improved according to a preferred embodiment of this invention illustrated in FIG. 3 wherein the tachometer is operated in a current mode rather than a voltage mode. To achieve this, the resistance seen by the tachometer including the input resistance $R_f$ is split and placed in the lines between the windings and the switching bridge. Junction AB of the windings is connected to switch A through one half of the input resistor 54 and junction CD is connected to switch D through the other half of the input resistor 55. A bipolar pair of Zener diodes 56 and 57 is connected between the lines connecting to switches A and D. Line 40 at the tachometer output is connected directly to summing junction SJ.

In a summing amplifier circuit, such as that including amplifier 50, the summing junction is at virtual ground. Therefore, when switches A and D are conductive as shown the entire path through the switches is at virtual ground. The signal developed by windings 20–22 appears as a current through resistors 54 and 55 which is applied directly to summing junction SJ. Since the circuit through switches A and D remains at virtual ground when the switches are conductive, the operating voltage range of the transistors is not exceeded even at maximum output from the alternator. Thus, sensitivity can be substantially increased. Zener diodes 56 and 57 are selected having threshold values which limit the potential across the windings to the operating range of the transistors so that the operating ranges are not exceeded when the switches are in the nonconductive state.

Figure 4:
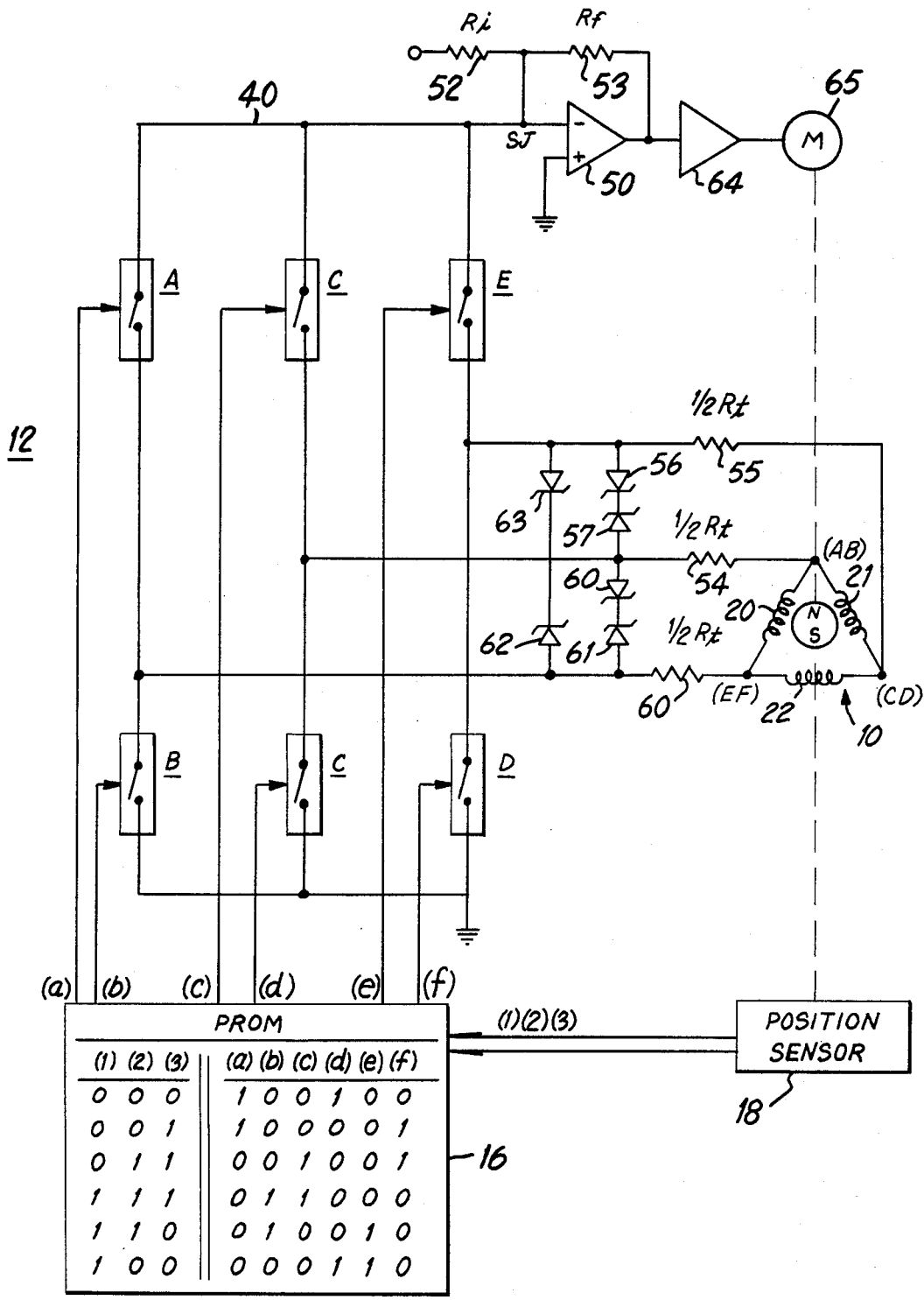
FIG. 4 is a schematic diagram illustrating a complete system of the type partially illustrated in FIG. 3.

FIG. 4 is a schematic diagram of the complete system of the type illustrated in FIG. 3. The output of operational amplifier 50 is supplied to a drive amplifier 64 which in turn is connected to drive motor 65. Motor 65 and alternator 10 of the tachometer have a common shaft. Junction AB of the tachometer windings is connected to switches A and B in bridge circuit 12 via resistor 54, whereas junction CD is connected to switches C and D via resistor 55 and junction EF is connected to switches E and F via resistor 60. Zener diodes 56–57 and 60–63 are connected across the three pairs of lines between the windings and the switches to limit the winding output voltages when the respective switches are nonconductive.

Figure 5:
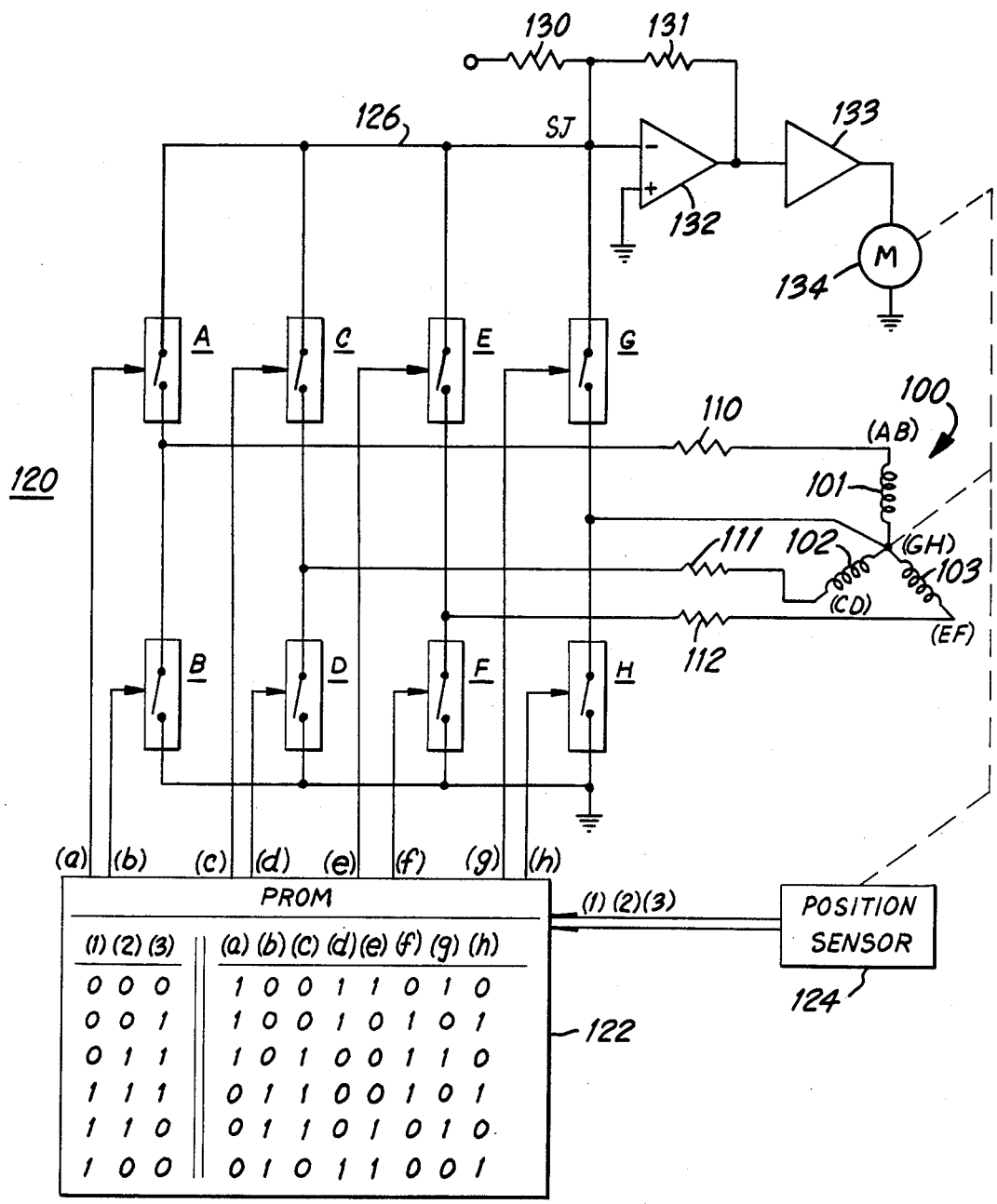
FIG. 5 illustrates a servo control system according to another embodiment of the invention wherein the commutator switching is from line-to-neutral.

FIG. 5 is a schematic diagram of another embodiment of the invention wherein the commutation is on a line-to-neutral basis rather than line-to-line basis in order to reduce ripple content in the tachometer output signal.

The alternator 100 includes windings 101–103 wound in a three-phase Wye configuration. One end of winding 101 is connected to switches A and B of a switching bridge circuit 120 via a resistor 110, one end of winding 102 is connected to switches C and D via a resistor 111 and one end of winding 103 is connected to switches E and F via a resistor 112. The other ends of windings 101–103 are connected to switches G and H. Switches A to H are FET's of the type previously described in FIG. 1.

Switches B, D, F and H are connected to ground whereas switches A, C, E and G are connected to a common tachometer ouput line 126. Resistors 110–112 are the input resistors of the summing circuit for developing the tachometer output current supplied to summing junction SJ via output line 126. A resistor 130 connected to the summing junction receives the command signal. Resistor 131 provides negative feedback around operational amplifier 132. The summing junction is connected to the inverting input of amplifier 132 and the noninverting input thereof is connected to ground. The output of amplifier 132 is supplied to a drive amplifier 133 which in turn controls energization of motor 134.

Motor 134, alternator 100 and a position sensor 124 are coupled to a common shaft. The position sensor provides a three digit code representative of six shaft positions and the output code, therefrom is supplied as the address to a 32×8 PROM 122. The table stored in PROM 122 is shown in FIG. 5. The outputs (a) to (h) are connected to control the conductive states of switches A to H, respectively.

Except for differences in the switching logic and the lower ripple in the tachometer output, the system in FIG. 5 operates similarly to the system in FIG. 4. It should be noted that in FIG. 5 the Zener diodes are not required to protect the FET switches in bridge circuit 120 since it is possible to connect the open winding across the unused one of resistors 110–112. For example, when the rotor is in position "000" (top line of table stored in PROM 122), switches A, D, E and G are conductive. As a result, current flows from ground through switch D, resistor 111, winding 102, winding 101, resistor 110 and switch A to summing junction SJ to thereby provide the tachometer output signal. Switches E and G connect resistor 112 across the remaining winding 103 to limit the generated potential to a low value within the operating range of transistors in switching bridge 120.

Although only a few embodiments have been described in detail, it should be obvious that there are other variations within the scope of this invention. The invention is more particularly defined in the appended claims.

I claim:

1. A DC tachometer comprising an alternator including
   a stator,
   a rotor, and
   windings for producing an alternating signal proportional to the speed of rotation;
   a rotor position sensor;
   a field effect transistor switching circuit controlled by said position sensor to produce a DC signal proportional to rotor speed from said alternating signal; and
   wherein said position sensor indicates position by a digital code and further including a read only memory for converting said digital code into control signals for said field effect transistor switching circuit.

2. In a motor control system of the type including a motor and a tachometer in a servo loop, the servo loop including a summing circuit for summing a command signal and a tachometer feedback signal at a summing junction, the improvement comprising;
   said tachometer being of the type including
      a rotor,
      a stator,
      windings for producing an alternating signal proportional to the speed of rotation, and
      a rotor position sensor;
   at least two field effect transistor switching circuits connected to each of said windings, said transistors being controlled by said position sensor to produce a DC signal proportional to rotor speed from said alternating signal and being controlled to operate in pairs to complete circuit paths between the windings and the summing junction; and
   input resistors for developing said tachometer feedback signal supplied to said summing junction being located between said windings and said field effect transistor switching circuits.

3. The system according to claim 2 further including means for limiting the potential across said switching circuit to the operating range of the field effect transistor in said switching circuit.

4. The system according to claim 3 wherein said means for limiting the potential across said switching circuit includes Zener diodes.

5. The system according to claim 3 wherein said means for limiting the potential across said switching circuit includes switches for connecting resistance across said windings when not supplying current to said summing junction.

* * * * *